July 23, 1940.  N. ANDERSSON  2,208,618
PANEL HOLDING CONSTRUCTION
Filed Feb. 25, 1939   2 Sheets-Sheet 1

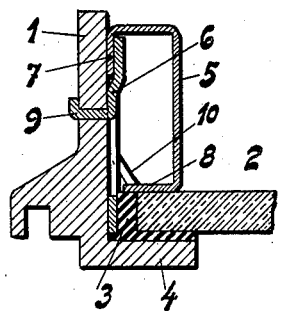
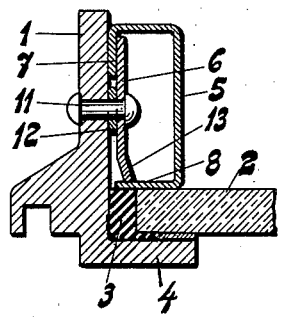
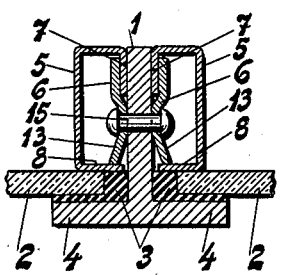
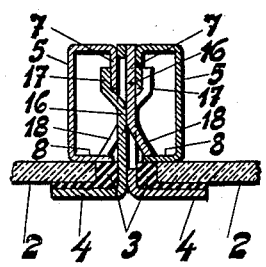
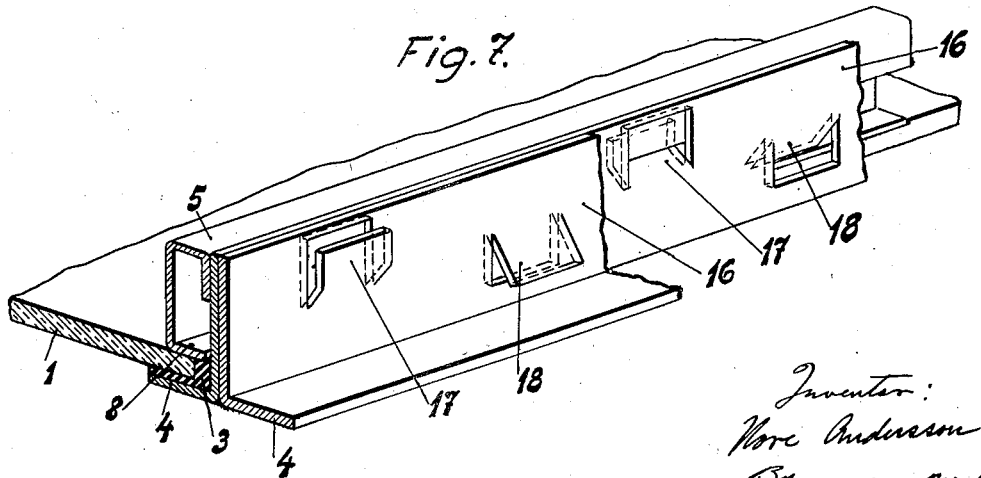

Patented July 23, 1940

2,208,618

UNITED STATES PATENT OFFICE 2,208,618

PANEL HOLDING CONSTRUCTION

Nore Andersson, Goteborg, Sweden, assignor to Aktiebolaget Götaverken, Goteborg, Sweden, a corporation of Sweden Application February 25, 1939, Serial No. 258,417
In Sweden March 3, 1938

5 Claims. (Cl. 189—78)

The present invention relates to structures such as doors, windows, casements, partitions and the like, in which panels of wood, metal, glass or the like are employed and the invention is particularly related to the frame or moulding, which embraces and holds the panels in place. More specifically the invention relates to that type of frames or mouldings, in which the panels are held between a flange, a seat or the like provided on the stile, rail, sash, muntin or the like of the frame and a separate panel holding strip provided with flanges directed more or less towards each other.

One object of the invention is to provide improved means for securing such panel holding strips without the use of tools or fastening screws or the like and in an easy, quick and effective manner.

In accordance with the invention the frame or the like is provided with grooves directed more or less away from each other and corresponding to the flanges of the panel holding strip, said flanges being adapted to engage said grooves, and, furthermore, at least one of said grooves is formed by fasteners projecting from the surface of the frame sections and preferably provided with an inclined surface. The holding strip is secured by a movement parallel to itself towards the panel or the like, during which movement at least one of the flanges of the strip moves across the abovementioned surface of the fasteners and when the strip has reached the desired position enters the corresponding groove due to the resiliency of the flange and/or said fasteners and thereby holds the strip in the desired position, in which the strip embraces the fasteners.

In the accompanying drawings some embodiments of the invention are illustrated by way of example.

In the drawings:

Figs. 3 and 4 are cross sections of the sash frame section and the pertaining parts according to the embodiments illustrated in Fig. 2.

Figs. 5 and 6 are cross sections of window muntins provided with holding strips on each side of the muntin.

Fig. 7 is a perspective view of the muntin according to Fig. 6 partly in section and partly broken away.

Figure 1:
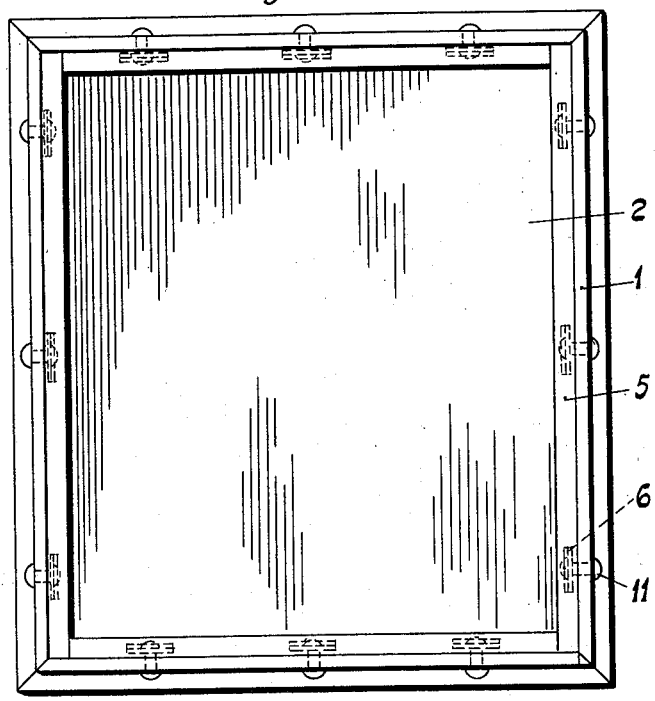
Fig. 1 is a front view of a window provided with a sash frame according to the invention.

In the embodiments of the invention illustrated in Figs. 1–4 the invention is employed for holding a glass pane at one side of a sash frame member of a window or the like, whereas Figs. 5, 6 and 7 illustrate the employment of the invention in cases, in which glass panes are provided on both sides of muntins or the like of a window frame.

In all embodiments illustrated in the drawings 1 designates L- or T-shaped frame sections having a glass pane 2 provided at one or both sides of the frame section, resting on a soft strip 3, for instance a putty or rubber strip or the like, and held against a flange 4 formed by the frame section. A holding strip 5 of sheet metal or similar thin elastic material and formed as a split tube preferably of rectangular cross section engages the glass pane at the opposite side to the flange 4. The strip 5 is secured to the frame section 1 through fasteners 6 provided on or formed by the frame section, said fasteners being adapted to cooperate in a manner described in detail hereinbelow with flanges 7 and 8 directed towards each other and provided on the strip.

Figure 2:
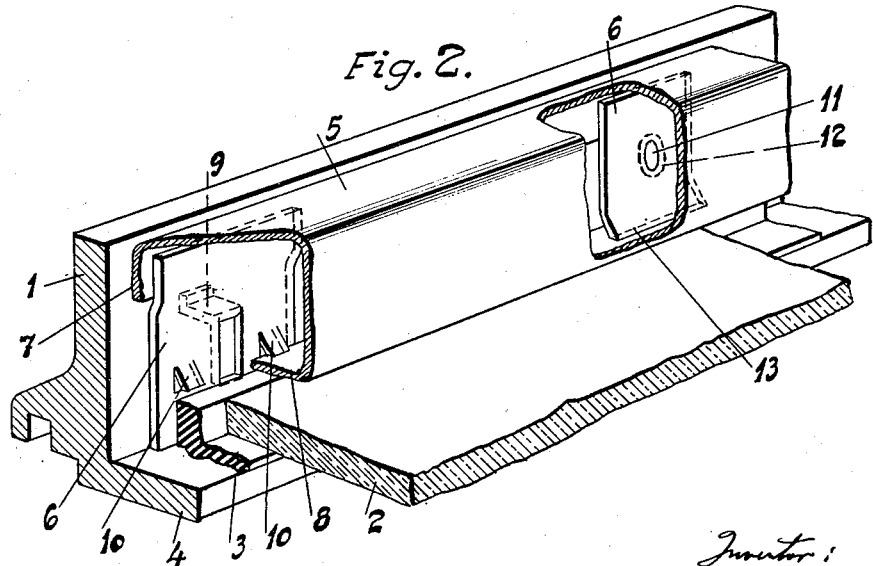
Fig. 2 is a perspective view of a portion of a sash frame section of a window provided with two different fasteners for the panel holding strip.

In the embodiment of the invention according to Figs. 2 and 3 the fastener 6 comprises a sheet metal piece, which is secured on one side of the frame section 1 by means of a tongue 9 pressed out of the material of the sheet metal piece. The tongue 9 extends through an opening in the web of the frame section 1 and embraces said web. The sheet metal piece 6 is in this case so shaped that it extends with one longitudinal edge along the flange 4 and that the opposite edge together with the web of the frame section 1 forms a deep groove for the flange 7, which groove is adapted to guide the flange 7 of the strip 5, when said strip is secured by being moved parallel to itself along the web towards the glass pane 2. The sheet metal piece 6 is, furthermore, provided with two lips 10 pressed out of the sheet material and slightly bent outwards so as to form two locking teeth adapted to cooperate with the flange 8 of the strip 5, which in this embodiment is directed at right angle towards the flange 7. Said teeth fix the strip in the holding position by being so disposed relatively to the border of the glass pane as to produce in connection with said border a groove or channel, which may be resiliently engaged by the flange 8, when the strip is moved to holding position, in which the strip bears on the glass pane 2 with one side surface.

The embodiment of the invention illustrated in Fig. 4 is carried out substantially in the same way as the embodiment above described. This is particularly true of the strip 5, which may be of exactly the same construction, and which may be held in position by means of flanges 7, 8 engaging a sheet metal piece 6 secured at one side of the frame section. The only difference consists in that the sheet metal piece 6 is secured at a side surface of the frame section 1 by means of one or more rivets 11 and held at a suitable distance from said side surface by means of washers 12 provided on said rivets so that a deep groove or channel corresponding to the thickness of the flange 7 is formed, and, furthermore, the part of the sheet metal piece 6 adjacent the glass pane is bent outwards to form an edge 13 disposed at a distance from the glass pane corresponding to the thickness of the flange 8, said edge serving to keep the strip 5 in position, when the flange 8 has entered the groove or the like thus formed, and preventing displacement of the strip away from the glass pane.

In the embodiment illustrated in Fig. 5, in which holding strips 5 are provided on both sides of the T-shaped frame section 1, the strips as well as the fasteners are carried out substantially in correspondence with the embodiment ilustrated in Fig. 4, the only difference being that the fastening plates 6 are carried out with such a cross section that the guide grooves for the flanges 7 are formed without the use of the washers otherwise necessary. Furthermore, the fastening plates at the opposite sides of the frame section may be secured by the same rivets 15. As obvious from Fig. 5 the somewhat outwardly bent edges 13 of the fastening plates 6 are disposed in the same manner as above described so as to form together with one side surface of the glass pane 2 a groove, which may be entered by the flange 8. The embodiment illustrated in Figs. 6 and 7 is carried out substantially in accordance with the embodiment just described, and differs from said embodiment only by the frame section being formed by two L-shaped folded sheet metal sections 16 welded together and the fasteners for the flanges 7, 8 cooperating therewith comprising tongues 17, 18 pressed out of the webs of the frame sections and bent outwards in a suitable manner.

The embodiments of the invention above described and illustrated in the drawings should only be considered as examples and the details of the invention may naturally be modified in several different ways within the scope of the following claims. The invention may advantageously be used for fitting glass panes in doors or for fitting other panels in suitable frames, and, furthermore, the holding strips as well as the fasteners may be carried out otherwise than illustrated. Instead of the rectangular cross section illustrated in the drawings the strips may have a triangular cross section or a quarter circular cross section. Furthermore, the frame sections as well as the holding strips may be carried out by any material, and, instead of iron or sheet metal or other metals, wood or other similar material may be used. The strips may be carried out in such a manner that they are comparatively rigid, and they may be solid and provided with suitable recesses for the fasteners, which may, for instance, comprise to a suitable extent, resilient tongues provided at or formed by the frame sections similarly to the tongues 10, 17 or 18. Naturally, the fasteners may comprise separate leave springs or the like provided at the frame sections 1 or the plates 6 and extending in the longitudinal or transverse direction of the holding strips. The plates 6 may be secured to the side surfaces of the frame sections by other means than the bent tongues 9 or rivets 11 or 15. They may, for instance, be secured by welding, preferably by spot welding.

What I claim is:

1. In a panel construction, a frame forming a seat for a panel, a panel, a panel holding strip, two longitudinal flanges in said panel holding strip inclined towards each other, a fastening means on a face of said frame, a guide groove for one of said flanges formed between said fastening means and said face and directed towards said panel, and a second fastening means projecting from said face and forming a surface, over which the other of said flanges moves when during a parallel movement of the strip towards the panel said first-mentioned flange moves into said guide groove, and forming together with said panel a second groove, into which said other flange enters due to resiliency when the first flange has been moved to full extent into the guide groove.

2. In a panel construction, a frame forming a seat for a panel, a panel, a panel holding strip, two longitudinal flanges of resilient material in said panel holding strip inclined towards each other, a fastening means on a face of said frame, a guide groove for one of said flanges formed between said fastening means and said face and directed towards said panel, and a second fastening means projecting from said face and forming a surface tapering relatively to said guide groove, the other flange being moved over said surface when during a parallel movement of the strip towards the panel said first-mentioned flange moves into the guide groove, and forming together with said panel a second groove, in which said other flange enters due to resiliency when the first flange has been moved to full extent into the guide groove.

3. In a panel construction, a frame forming a seat for a panel, a panel, a panel holding strip of resilient sheet metal, two longitudinal flanges in said panel holding strip inclined at right angles towards each other, a fastening means on a face of said frame, a guide groove for one of said flanges formed between said fastening means and said face and directed towards said panel, and a second fastening means projecting from said face and forming a surface, over which the other of said flanges moves when during a parallel movement of the strip towards the panel said first-mentioned flange moves into said guide groove, and forming together with said panel a second groove, in which said other flange enters due to resiliency when the first flange has been moved to full extent into the guide groove.

4. In a panel construction, a frame forming a seat for a panel, a panel, a panel holding strip, two longitudinal flanges in said panel holding strip inclined towards each other, one or more fastening plates secured on a face of said frame, a portion of said plates remote from said panel disposed at a distance from said face and forming together with said face a guide groove for one of said flanges directed towards said panel, and a second portion of said plates adjacent the panel projecting from said face of the frame and forming a surface tapering outwards relatively to said guide groove, over which surface the other of said flanges moves when during a parallel movement of the strip towards the panel said first-mentioned flange moves into said guide groove, and forming together with said panel a second groove, into which said other flange enters due to resiliency when the first flange has been moved to full extent into the guide groove.

5. In a panel construction, a sheet metal frame forming a seat for a panel, a panel, a panel holding strip, two longitudinal flanges in said panel holding strip inclined towards each other, one or more fastening tongues pressed out of a web of said sheet metal frame remote from said panel and forming together with a face of said web a guide groove for one of said flanges directed towards said panel, and one or more second fastening tongues pressed out of said web adjacent the panel and projecting from said face of the frame and forming a surface tapering outwards relatively to said guide groove, over which surface the other of said flanges moves when during a parallel movement of the strip towards the panel said first-mentioned flange moves into said guide groove, and forming together with said panel a second groove, into which said other flange enters due to resiliency when the first flange has been moved to full extent into the guide groove.

NORE ANDERSSON.